United States Patent [19]
Zemanek, Jr.

[11] 3,882,375
[45] May 6, 1975

[54] ELECTROMAGNETIC WELL LOGGING SYSTEM HAVING RECEIVER AND NULLING COILS MOUNTED ON SEPARATE MAGNETIC CORES

[75] Inventor: Joseph Zemanek, Jr., Dallas, Tex.

[73] Assignee: Mobil Oil Corporation, New York, N.Y.

[22] Filed: Jan. 28, 1974

[21] Appl. No.: 437,129

[52] U.S. Cl. .................................................. 324/6
[51] Int. Cl. .......................... G01v 3/18; G01v 3/10
[58] Field of Search ........................... 324/6, 8, 3, 4

[56]    References Cited
        UNITED STATES PATENTS

| | | | |
|---|---|---|---|
| 2,220,788 | 11/1940 | Lohman | 324/6 |
| 3,147,429 | 9/1964 | Moran | 324/6 |
| 3,187,252 | 6/1965 | Hungerford | 324/6 |
| 3,327,203 | 6/1967 | Attali | 324/6 |
| 3,493,850 | 2/1970 | Schuster | 324/6 |
| 3,555,409 | 1/1971 | Atwood et al. | 324/6 |
| 3,657,636 | 4/1972 | Dowling et al. | 324/6 |
| 3,715,655 | 2/1973 | Dowling et al. | 324/6 |

Primary Examiner—Gerard R. Strecker
Attorney, Agent, or Firm—C. A. Huggett; George W. Hager, Jr.

[57] ABSTRACT

A borehole tool for logging the magnetic properties of the earth formation surrounding a borehole includes transmitter, receiver, and nulling coils. The receiver and nulling coils are wound about separate low-reluctance magnetic core members and are connected in series opposition. A phase-sensitive detector is connected across the receiver and nulling coils and provides a signal representative of the formation magnetic properties.

7 Claims, 2 Drawing Figures

ELECTROMAGNETIC WELL LOGGING SYSTEM HAVING RECEIVER AND NULLING COILS MOUNTED ON SEPARATE MAGNETIC CORES

BACKGROUND OF THE INVENTION

This invention relates to induction well logging and more particularly to logging magnetic properties of the earth.

Induction logging is a method of measuring the characteristics of the earth formations surrounding a borehole. Generally, a borehole tool comprising a transmitter coil and a receiver coil is passed through the length of the borehole. The transmitter coil is energized with a flow of alternating current to thereby create an alternating magnetic field in the formations traversed by the borehole. This alternating field is a composite field comprising a primary electromagnetic field and a secondary electromagnetic field.

The primary field produces a voltage in the receiver coil that would exist as a result of the mutual flux coupling between the transmitter and receiver coils if both coils were located only in a vaccum (i.e., without outside influence as would exist within the borehole). The secondary field produces in the receiver coil an additional voltage which is dependent on the magnetic properties of the formation material.

SUMMARY OF THE INVENTION

A borehole tool for logging the magnetic property characteristics of the earth formation surrounding the borehole includes a coil system adapted for movement throughout the length of the borehole. Such coil system includes a transmitter coil and a receiver coil mounted such that the receiver coil is electromagnetically coupled with the transmitter coil in part through the earth formation adjacent the borehole. A magnetic core supports the receiver coil and a portion of the transmitter coil. A nulling coil is positioned on a separate magnetic core along with the remaining portion of the transmitter coil. These two cores are coaxially mounted with respect to each other. The nulling coil on one of the cores is connected in series opposition with the receiver coil on the other core. This nulling coil is located close enough to the transmitter coil such that the total voltage induced across both the receiver and nulling coils when the transmitter coil is energized with alternating current is representative of the electrical conductivity and magnetic susceptibility of the adjacent earth formation. The magnetic cores are made of similar low-reluctance material such that the sensitivity of the borehole tool to the magnetic properties of the formation is not affected by temperature variations throughout the length of the borehole.

In a further aspect, a phase-sensitive detector is provided to distinguish between an in-phase component and a quadrature component of the induced voltage, the in-phase component being in phase with the transmitter coil current and the quadrature component being 90° out of phase with the transmitter coil current. The detector provides an output representative solely of the quadrature component.

In a still further aspect, the frequency of the alternating current through the transmitter coil is such that the quadrature component of the induced voltage across the receiver and nulling coils is affected to a greater extent by the magnetic susceptibility of the formation surrounding the borehole than by the formation conductivity.

DETAILED DESCRIPTION OF THE INVENTION

Figure 1:
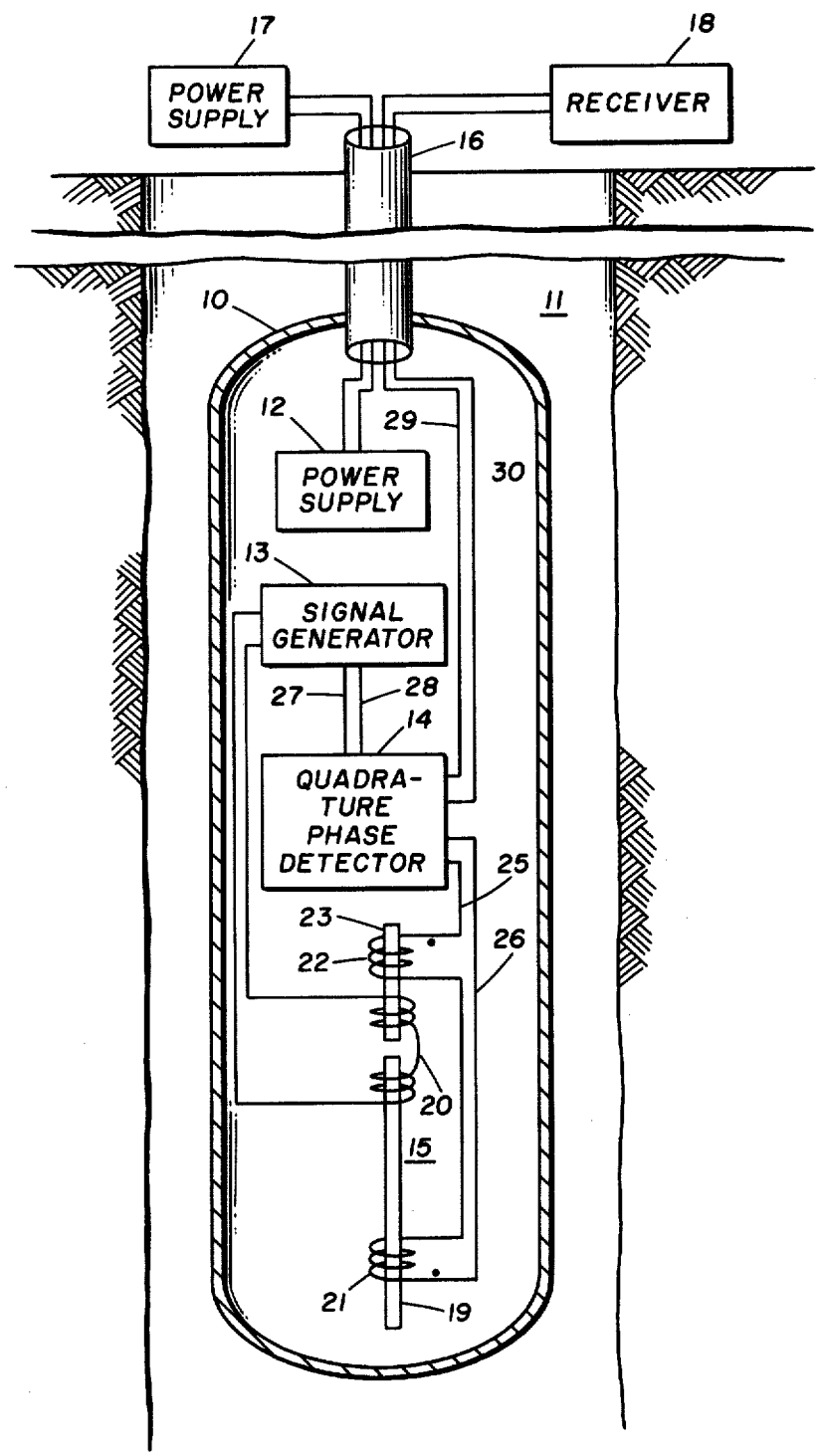
FIG. 1 is a diagrammatic representation of a logging tool in a borehole, including a schematic block diagram of circuit components.

Referring now to FIG. 1, a borehole tool 10 is employed for traversing the borehole 11. Located within the borehole tool 10 are a power supply 12, a signal generator 13, a phase detector 14, and coil system 15. The borehole tool 10 is suspended in the borehole by means of the cable 16 which includes the electrical coupling from the borehole tool 10 to an uphole power supply 17 and a recorder 18.

Considering the coil system 15 in greater detail, such coil system includes a core member 19 about which is wound a portion of transmitter coil 20 and a receiver coil 21, and a core member 23 about which is wound the remaining portion of transmitter coil 20 and a nulling coil 22. The receiver coil is electromagnetically coupled with the transmitter coil in part through the earth formation adjacent the borehole. As the borehole tool 10 is moved through the borehole 11, the signal generator 13 energizes the transmitter coil 20 with alternating current. This flow of alternating current in the transmitter coil 20 creates an alternating magnetic field that induces in the receiver coil 21 a total voltage $V_R$ having a voltage component $V_I$ which is in phase with the transmitter coil current and a quadrature voltage component $V_Q$ which is 90° out of phase with the transmitter coil current. This relationship can be shown as follows:

$$V_R = V_I + jV_Q \quad (1)$$

where, $V_I$ = the in-phase component, and
$V_Q$ = the quadrature component.

The expression for the voltage $V_Q$ in receiver coil 21 may be further represented as follows:

$$V_Q = A\mu(1 - (2/3)Z^3 + (1/2)Z^4 - (2/15)Z^5 + \ldots\ldots \quad (2)$$

in which, $$A = \frac{\omega A_T A_R I}{2\pi L^3} \quad (3)$$

and $$Z = \left(\frac{\omega \mu \sigma}{2}\right)^{1/2} L \quad (4)$$

where, $A_T$ = area of transmitter coil times number of turns,
$A_R$ = area of receiver coil times number of turns,
$I$ = transmitter energizing current,
$L$ = transmitter-receiver coil separation,
$w = 2\mu$ times transmitter frequency $f$,
$\mu$ = formation permeability, and
$\sigma$ = formation conductivity.

As is apparent from Equation (4), the term Z represents the over-all effect of the electrical conductivity of the formation on the quadrature voltage $V_q$ since this term includes the conductivity variable $\sigma$.

The effect of the formation magnetic susceptibility X is represented by the expression for the formation permeability $\mu$ as follows:

$$\mu = \mu_o(1 + 4\pi X) \quad (5)$$

where, $\mu_o$ = permeability in a vacuum.

Accordingly, the quadrature voltage $V_q$ can be represented by the expression:

$$V_q = A\mu_o(1 + 4\pi X)(1 - (2/3)Z^3 + (1/2)Z^4 - (2/15)Z^5 + .....) \quad (6)$$

It can be seen from this expression that changes in the magnetic susceptibility of the formation, as represented by the susceptibility term X, have a linear effect on $V_q$. On the other hand, changes in the term Z, which is related to conductivity, have a nonlinear effect since this term is expanded by the powers 3, 4, 5, etc. More particularly, it has been found that at transmitter frequencies above 1000 hertz, changes in the formation conductivity have a more pronounced effect than changes in the susceptibility X. In fact, for a 10 to 1 change in frequency from 1000 hertz to 100 hertz there is a corresponding 31 to 1 change in the conductivity effect. For example, the term $Z^3$ can be represented by the terms of Equation (4) as:

$$Z^3 = \left(\frac{2\pi f\mu\sigma}{2}\right)^{3/2} L \quad (7)$$

Therefore, the frequency effect varies by the power 3/2, and for a 10 to 1 change in frequency from 1000 hertz to 100 hertz there is a corresponding 31 to 1 change in the conductivity effect on the quadrature voltage $V_q$. Similar reasoning holds for the remaining terms $Z^4$, $Z^5$, etc., in Equation (6). Consequently, as transmitter frequency is increased, changes in formation conductivity $\sigma$ have a larger effect on the quadrature voltage than do corresponding changes in formation susceptibility. Likewise, as transmitter frequency is decreased, changes in formation susceptibility will have a larger effect on the quadrature voltage than corresponding changes in formation conductivity. By choosing a transmitter frequency of 100 hertz or less, the susceptibility effect will be 31 times greater than the conductivity effect and, consequently, the sensitivity of the borehole tool to magnetic susceptibility is greatly enhanced.

Figure 2:
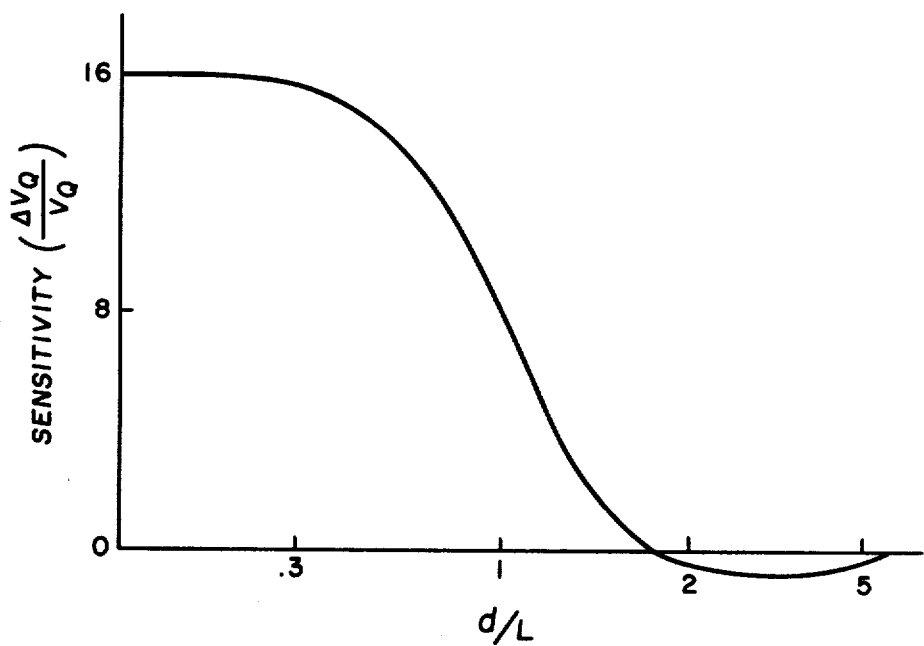
FIG. 2 illustrates the variation in sensitivity of the logging tool of FIG. 1 with variations in coil separation.

A further effect of the term Z of Equation (4) on the borehole tool sensitivity is that of the transmitter-receiver coil separation L, this effect being illustrated in FIG. 2. The change in the quadrature voltage from a vacuum environment to the borehole environment, $\Delta V_q/V_q$, is represented as a logarithmic function of $d/L$ where $d$ is the borehole diameter and L is the coil separation. With $d/L$ in the range of 2 to 5, the sensitivity to magnetic material is practically nonexistent. As $d/L$ decreases, the sensitivity curve rises. When $d/L$ is less than about 0.4, the full sensitivity of the borehole tool to the magnetic material is obtained. Therefore, for a typical borehole having an 8 inches diameter, a transmitter-receiver coil spacing of 20 inches or greater will permit the borehole tool to have maximum sensitivity.

In addition to the transmitter coil current frequency and the transmitter-receiver coil separation considerations, temperature considerations are also important. It is important that the sensitivity of the logging tool to the formation magnetic susceptibility not be adversely affected by temperature variations in the borehole environment as the tool is traversed along the length of the borehole. Prior art logging tools utilizing a magnetic core material with a high coefficient of thermal expansion have presented difficulties since temperature variations along the borehole effect variations in the magnetic reluctance of the magnetic core material. Any change of the magnetic reluctance of the core material caused by such temperature variations produces a corresponding change in the quadrature voltage induced in the receiver coil. Accordingly, many have attempted to alleviate this problem by utilizing a material having a low coefficient of thermal expansion for the core material. For example, see U.S. Pat. No. 3,644,823 to Dowling et al. and U.S. Pat. No. 3,147,429 to J. H. Moran. However, if a logging tool having a core material with a low coefficient of thermal expansion, for example, a hollow core of a fiber core, is used, the reluctance of the electromagnetic flux path inside the core will be large compared to the reluctance portion of the electromagnetic flux path formed by the surrounding formations. Consequently, variations in the reluctance of the formation, as effected by variations in magnetic susceptibility, will be relatively insignificant when compared to the total reluctance and difficult, therefore, to measure. on the other hand, in a borehole tool having a core material of low reluctance, the quadrature voltage induced in the receiver coil will be due primarily to changes in the reluctance of the surrounding formations.

It is, accordingly, a specific feature of the present invention that the core 19 utilized in the borehole tool be made of magnetic material having a low reluctance such that the sensitivity of the borehole tool to variations in the magnetic susceptibility of the formations may be enhanced. However, in order to minimize the adverse effects which such low-reluctance magnetic material will have upon the induced quadrature voltage under temperature variations in the borehole environment, there is provided the nulling coil 22 which is electrically connected in series opposition with the receiver coil 21.

Nulling coils connected in series opposition with receiver coils have been utilized by others in induction logging systems, for example, U.S. Pat. No. 3,327,203 to G. Attali and U.S. Pat. No. 3,065,407 to Huddleston, Jr., et al. In such prior art systems, the receiver coil and the nulling coil are spaced relative to the transmitter coil such that the quadrature voltage induced in the receiver coil is canceled, or nulled, by an opposite polarity quadrature voltage induced in the nulling coil. Such induction logging systems are, consequently, utilized to measure the in-phase induced voltage, the quadrature-induced voltage being nulled.

It is a specific feature of the present invention that the nulling coil 22 be connected in series opposition with a receiver coil 21 and spaced in relation to the transmitter coil 20 such that the guadrature voltage across the series-connected nulling and receiver coils when located in a vacuum environment is zero but when located in the borehole environment is indicative of the magnetic properties of the adjacent formation material. This is accomplished in accordance with the present invention by placing the nulling coil 22 close enough to the transmitting coil 20 that the voltage induced in the nulling coil is not affected by the presence of the formation material surrounding the borehole. It is a further feature of the present invention that the nulling coil 22 be mounted on the low-reluctance magnetic core 23 along with the remaining portion of the transmitter coil 20. In this manner, there is no common magnetic flux path from the nulling coil 22 to the receiver coil 21 due to their mountings on separate cores.

One embodiment of the borehole tool of the present invention particularly suitable for use in a borehole having an 8 inches diameter would include cores of 3 inches diameter made up of, for example, laminations of the same high-grade magnetic material. The coil diameters for the three coils, transmitter coil 20, receiver coil 21, and nulling coil 22, are, consequently, approximately 3 inches in diameter. The receiver coil 21 is spaced from the transmitter coil along core 19 by a distance of 20 inches or greater. The nulling coil 22 is spaced along core 23 from the transmitter coil by a distance of 2 inches or less. In fact, the nulling coil could even be located contiguous to the transmitter coil, i.e., on top of, below, or immediately adjacent to the transmitter coil.

In accordance with the foregoing embodiment of the present invention, the quadrature voltage induced in the nulling coil may be represented by the expression:

$$V_N = A_1 I \mu_o, \quad (8)$$

while the quadrature voltage induced in the receiver coil may be represented by the expression:

$$V_R = A_2 I \mu_o (1 = 4\pi X). \quad (9)$$

From these expressions, the total quadrature voltage may be represented by the subtraction of Equation (8) from Equation (9):

$$V_Q = V_R - V_N = A_2 I \mu_o (1 + 4\pi X) - A_1 I \mu_o \quad (10)$$

where, $$A_1 = \frac{\omega A_T A_R I}{2\pi L_1^3} \quad (11)$$

and $$A_2 = \frac{\omega A_T A_N I}{2\pi L_2^3} \quad (12)$$

and in which, $A_T$ = area of transmitter coil times number of turns,
$A_R$ = area of receiver coil times number of turns,
$A_N$ = area of nulling coil times number of turns,
$L_1$ = transmitter-receiver coil separation,
$L_2$ = transmitter-nulling coil separation, and
$I$ = transmitter coil current.

By properly selecting the number of turns in the receiver and nulling coils for the desired transmitter-receiver coil separation and transmitter-nulling coil separation, $A_1$ can be made equal to $A_2$. Equation (10) is then reduced to:

$$V_Q = A_2 I \mu_o 4\pi X \quad (13)$$

Hence, Equation (1) which represented the two-coil system, may be rewritten for the three-coil system of the present invention as follows:

$$V_{R+N} = V_I + j A_2 I \mu_o 4\pi X \quad (14)$$

This voltage $V_{R+N}$ of the three-coil system is then applied by way of lines 25 and 26 to the quadrature phase detector 14. Also applied to detector 14 by way of lines 27 and 28 is a reference voltage from the signal generator representative of the phase of the transmitter coil current I. Detector 14 distinguishes between the voltage components of $V_{R+N}$ which are in phase and in quadrature with the transmitter coil current I and applies only the quadrature voltage component $A_2 I \mu_o 4\pi X$ as a measurement of formation magnetic susceptibility to the uphole recorder 18 by way of lines 29 and 30. Signal generators, phase-sensitive detectors, power supplies, and recorders suitable for use in magnetic susceptibility logging are well known in the art. Examples of such components are illustrated and described in U.S. Pat. No. 2,625,583 to Robert A. Broding. While the particular phase detector illustrated in U.S. Pat. No. 2,625,583 is capable of rejecting an undesired signal component, for example, the in-phase component, the selectivity of such a detector may be enhanced in the manner disclosed in U.S. Pat. No. 2,788,483 for PHASE REJECTION NETWORKS to Henri-Georges Doll.

It is to be understood that various modifications to the disclosed embodiment as well as alternate embodiments may become apparent to one skilled in the art without departing from the scope and spirit of the invention as defined by the appending claims.

I claim:

1. Apparatus for electromagnetically logging the earth formation surrounding a borehole, including:
    a. a pair of coaxially supported magnetic cores,
    b. a transmitter coil mounted partly on each of said magnetic cores,
    c. means for providing alternating current to said transmitter coil to thereby cause an alternating magnetic field in the earth formation surrounding the borehole,
    d. a receiver coil mounted on one of said magnetic cores in coaxial-spaced relationship with said transmitter coil,
    e. a nulling coil connected in series opposition to said receiver coil and mounted on the other of said magnetic cores in such a position that the total induced voltage across the nulling and receiver coils caused by said alternating magnetic field is indicative of the magnetic susceptibility and electrical conductivity of the earth formation, and
    f. said magnetic cores being of similar low-reluctance material whereby said induced voltage across the nulling and receiver coils is not affected by temperature variations throughout the length of the borehole.

2. The apparatus of claim 1 wherein said receiver coil is axially positioned at a distance of at least 20 inches from said transmitter coil.

3. The apparatus of claim 1 wherein said nulling coil is contiguous to said transmitter coil.

4. The apparatus of claim 1 wherein said induced voltage has an in-phase component which is in phase with the transmitter coil current and a quadrature component which is 90° out of phase with the transmitter coil and further including a phase-sensitive detecting means to which said induced voltage is applied for providing a signal representative solely of the quadrature component of said induced voltage.

5. The apparatus of claim 4 wherein the frequency of the alternating current in said transmitter coil is such that the quadrature component of said induced voltage across said receiver and nulling coils is affected to a greater extent by the magnetic susceptibility of the formation surrounding the borehole than by the formation conductivity.

6. The apparatus of claim 5 wherein said frequency is no greater than about 100 hertz.

7. A system for logging the magnetic susceptibility of an earth formation adjacent a borehole, having:

a. a pair of cores comprised of a lowreluctance magnetic material located within the borehole,
b. a transmitter coil mounted on said cores,
c. a receiver coil mounted on one of said cores such that is is electromagnetically coupled with the transmitter coil in part through the earth formation adjacent the borehole,
d. a nulling coil connected in series opposition with the receiver coil and mounted on the other of said cores such that the electromagnetic coupling between it and the transmitter through the earth formation adjacent the borehole is minimized, and
e. a phase-sensitive detector which distinguishes between an in-phase component and a quadrature component of the total voltage induced across both the receiver and the nulling coils when the transmitter coil is energized with alternating current, such quadrature component being a measure of the magnetic susceptibility of the earth formation adjacent the borehole.

* * * * *